May 31, 1938. E. VAN LEUNEN 2,119,370
LIGHT CONTROL MEANS FOR HEADLIGHTS AND THE LIKE
Filed Feb. 17, 1937
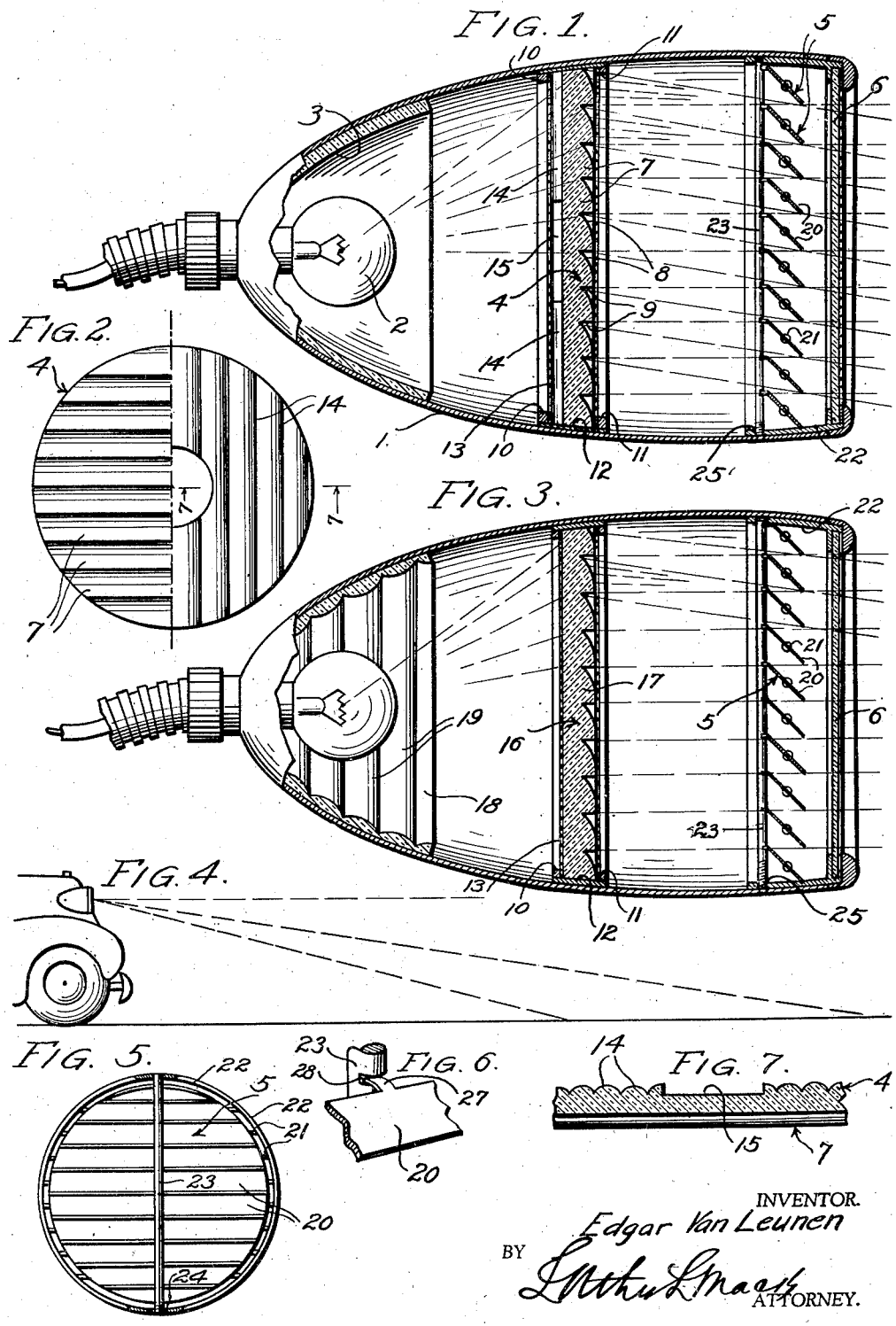
INVENTOR.
Edgar Van Leunen
BY
ATTORNEY.

Patented May 31, 1938

2,119,370

UNITED STATES PATENT OFFICE 2,119,370

LIGHT CONTROL MEANS FOR HEADLIGHTS AND THE LIKE

Edgar Van Leunen, Terminal Island, Los Angeles, Calif., assignor to The Van Ladden Corporation, a corporation of Maryland Application February 17, 1937, Serial No. 126,240

1 Claim. (Cl. 240—41.3)

This invention relates to and has for an object the provision of a light control means for headlights, flood lights and similar lamps, wherein said means will eliminate objectionable and dangerous glaring effects, while providing for a direction controlled projection of intensified light rays for effectively illuminating roadways and other areas in front of such lights.

Another object of this invention is to provide an improved headlight or the like wherein the above-noted objects are obtained through the medium of a light control means which includes a lens of special construction and a shutter or non-glare shield cooperating therewith in the particular manner of this invention.

A further object is to provide a headlight of the character described wherein the light control means includes an efficient light diffusing means from which light rays are uniformly distributed through the lens.

Otherwise stated my invention embodies in a headlight or flood light the combination with a special lens formed on its front face with a series of parallel refraction areas, of a suitable light diffusing means located rearwardly of said front face, and a means forwardly of said lens for obscuring the direct rays from vision while yet permitting the downwardly inclined rays to be projected upon a surface such as a roadway or field for effective lighting thereof.

I have shown a preferred form of my invention in the accompanying drawing, subject to modification within the scope of the appended claim without departing from the spirit of my invention.

Referring to the drawing:

Fig. 1 is a sectional view of a headlight on a longitudinal axis, constructed in accordance with this invention, in which a diffusing means is embodied in the lens, Fig. 2 is a fragmentary front elevation showing the one-half of the face on obverse side of the lens unit and one-half of the rear or reverse side of the lens, Fig. 3 is a sectional view on a longitudinal axis, of a modification of the invention, in which the diffusing means is mounted apart from the lens, Fig. 4 is a fragmentary side elevation of an automobile as when equipped with headlights of this invention, Fig. 5 is a rear elevation of the shutter or shield removed from the light casing, Fig. 6 is a fragmentary perspective view showing the means for adjusting the shutters or shield, and Fig. 7 is a sectional view taken on the plane of line 7—7 of Fig. 2, showing characteristics of the lens.

One form of my invention as shown in Fig. 1, comprises a headlight, flood light or similar lamp which is made up of a casing 1, a source of light 2, a reflector 3, a lens unit 4, a shutter or non-glare shield 5 and a plain glass closure 6. With this arrangement, the lens unit 4 and shutter or shield 5 primarily constitute a light control means which will eliminate glaring effects and provide for a direction controlled emanation of concentrated light rays.

The lens unit 4 is of special construction for effecting a predetermined directional control of projection of light rays. As here shown the outer face of the lens is formed with a series of horizontally disposed rib-like portions 7, each of which serves as a separate lens or refracting area that extends fully across the face of the lens unit. Each of these portions 7 is similar and preferably identical as to cross-section and size, with the other of said portions as variable as may be required, and is provided with an upright convex outer face 8 and a plane, horizontally disposed lower face 9. The lower faces 9 of the portions 7 are substantially parallel with the focal axis of the light. The outer face 8 of each portion 7 is identically or variably curved forwardly and downwardly from the top of said portion to the outer edge of the lower face 9 thereof. This curve is such that the majority of the light rays projected from the portions 7 will be directed downwardly and forwardly and convergently as well. For the most part the horizontally projected light rays are issued only at the junctures of said curved faces with the lower faces 9, or, in other words, between the lens portions 7 as indicated in Figs. 1 and 3. However these horizontal rays are fewer than the rays emanated from the larger areas of the curved surfaces 8 and the majority of said horizontal rays will be obstructed by the shutter means 5. Thus it is seen that the greater part of the light rays will be projected outwardly, downwardly and convergently, whereby to avoid, as will be hereafter explained, the blinding and glaring effects caused by uncontrolled projection and particularly the horizontally and upwardly projected rays.

As here shown the lens unit is held in place in the casing by means of rings 10 and 11, there being gaskets 12 and 13 between the lens and casing and lens and rings respectively.

In the form of the invention shown in Figs. 1 and 2 the lens is formed with its rear face vertically corrugated or ribbed. The corrugation or ribs 14 extend at right angles to the lens portions 7 and act as diffusing mediums whereby to equalize the distribution of light rays through the lens and thereby facilitate a concentrated and controlled projection by the transverse lens portions 7.

Centrally of the rear face of the lens is a plain circular portion 15 whereby no light diffusion will occur at this point and the light rays will concentrate at the center of the lens proper for intensifying the light projection from the lens along the focal axis thereof.

Instead of the lens unit 4 having the front and rear faces formed as provided in Figs. 1 and 2, I may use a lens 16 as shown in Fig. 3, wherein the rear face is plain and the front face is formed with lens portions 17 exactly corresponding to or differing from the portions 7. In place of the diffusing portions on the rear face of the lens I employ a diffusing type of reflector 18 wherein the reflecting face is formed with irregular, annular or arcuate portions or ribs 19.

In both forms of the invention as here shown the shutter or non-glare shield 5 is of the same construction and arrangement, and consists of a plurality of rectangular and horizontally disposed shutter plates 20 having trunnions 21 intermediate their edges and pivoted on a common circular ring 22. These shutters are identically downwardly and forwardly inclined and lie in spaced parallelism to provide spaces therebetween for the emanation of light rays. It is therefore seen that the drivers of vehicles approaching or in front of the light and pedestrians when the eyes of the driver and pedestrian are above the horizontal plane coinciding with the lower edge of the topmost shutter plate 20 may look directly into the light without being blinded or confused. This is due to the effective shielding of the lens by the shutters, yet owing to the directional control of the light rays projected from the lens portions 7, said rays will be directed through the openings or spaces between the shutters.

It should be noted that the lens is so formed and focused relative to the shutter means that each lens portion 7 will direct a converging group of light rays to a focus through the space between a pair of the shutters and these foci will be located adjacent the outer lower marginal edges of the shutter plates. The spaces between the shutters are substantially in line with the lower faces 9 of the lens portions 7 as will be seen with reference to Figs. 1 and 3.

It will be noted that the lens is constructed so that the plurality of the separate lens portions or refracting areas 7 will project concentrated groups of converging light rays through the spaces between the shutters in such manner that although said shutters will shield the lens and prevent glaring effects, they will not appreciably obstruct the directional projection of the focused rays from the lens. This is due to the directional projection of the rays whereby the rays focus adjacent the outer lower marginal edges of the shutter plates.

Thus it is apparent that with the means of this invention, intensely illuminating light rays will be projected under such directional control as to provide the desired illumination without objectionable glaring effects.

The horizontally disposed and parallel shutter plates 20 may be mounted in any suitable manner, and as shown in the drawing, these shutter plates have trunnions 21 the ends of each being engaged in suitable apertures in the circular band or ring 22. Each shutter plate is formed with a rearwardly extending tongue 27 that is engaged in a recess 28 formed in rod 23. The rod is inserted through an opening in the circular ring or band 22 and the threaded end 24 is engaged in a threaded opening 25 in the ring 22 that is located diametrically opposite to the aforementioned opening. The circular ring or band 22 and the shutter mechanism may be conveniently assembled before it is inserted in the open end of the lamp casing.

I claim:

A light projector comprising an elongated casing, a source of parallel light rays in the rear thereof, a lens in said casing forwardly of said light source, said lens having its forward face formed with a plurality of horizontally disposed parallel light refracting portions, each portion being substantially of the same size and shape and each having a curved outer face and a flat lower horizontally disposed face, the rear face of said lens having a plurality of vertically disposed light diffusing convex ribs each substantially semi-circular in cross section, said diffusing ribs covering substantially the entire rear face of said lens except for a central area, said central area having a surface lying in one plane, a shield positioned within said casing forwardly of said lens, said shield including a plurality of parallel and horizontally disposed shutter plates arranged in downwardly inclined relation, the lower edge of one shutter plate being in substantially the same horizontal plane as the upper edge of an adjacent shutter plate, said shield being so positioned with respect to said lens that the downwardly refracted light rays and the horizontal light rays from said convex light refracting portions will converge to horizontal foci adjacent the outer lower marginal edges of said shutter plates, and a front transparent closure for the casing.

EDGAR VAN LEUNEN.